United States Patent
Masuda et al.

(10) Patent No.: US 8,151,725 B2
(45) Date of Patent: Apr. 10, 2012

(54) INDICATOR APPARATUS

(75) Inventors: Hideki Masuda, Niigata (JP); Tatsuki Kawamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 328 days.

(21) Appl. No.: 12/531,931

(22) PCT Filed: Mar. 18, 2008

(86) PCT No.: PCT/JP2008/054936
§ 371 (c)(1),
(2), (4) Date: Sep. 18, 2009

(87) PCT Pub. No.: WO2008/114786
PCT Pub. Date: Sep. 25, 2008

(65) Prior Publication Data
US 2010/0064961 A1    Mar. 18, 2010

(30) Foreign Application Priority Data

Mar. 21, 2007 (JP) ................................. 2007-073780
Sep. 12, 2007 (JP) ................................. 2007-236060

(51) Int. Cl.
*G01D 13/22* (2006.01)
*G01D 11/28* (2006.01)
*G01D 7/00* (2006.01)

(52) U.S. Cl. . 116/286; 116/204; 116/62.1; 116/DIG. 36

(58) Field of Classification Search ............... 116/204, 116/284, 286, 287, 288, 303, 62.1, 62.4, 116/DIG. 36; 324/167

See application file for complete search history.

(56) References Cited

U.S. PATENT DOCUMENTS

| | | | | |
|---|---|---|---|---|
| 4,016,827 A | * | 4/1977 | Lawrence, Jr. | 116/204 |
| 4,968,930 A | * | 11/1990 | Grupp et al. | 324/115 |
| 4,973,905 A | * | 11/1990 | Neidhardt | 324/164 |
| 6,538,423 B1 | | 3/2003 | Sato et al. | |
| 6,827,034 B1 | * | 12/2004 | Paulo | 116/286 |
| 7,810,444 B2 | * | 10/2010 | Sultan et al. | 116/288 |
| 2006/0267444 A1 | | 11/2006 | Kodani | |

FOREIGN PATENT DOCUMENTS

| | | | |
|---|---|---|---|
| DE | 19537666 A1 | * | 4/1997 |
| DE | 102006047896 | * | 4/2008 |
| FR | 2902885 A1 | * | 12/2007 |

(Continued)

*Primary Examiner* — R. A. Smith
(74) *Attorney, Agent, or Firm* — McDermott Will & Emery LLP (57) ABSTRACT

To provide an indicator apparatus in which a pointer is secured to a pointer drive means by attraction force of magnets and it is possible to prevent an overshoot and pulsation of the pointer with sufficient attraction force. The indicator apparatus has a display plate 21, a pointer 22 provided on a front-face side of the display plate 21, and a pointer drive means provided on a back-face side of the display plate 21 for rotating the pointer 22. The indicator apparatus includes first magnet 22c in a ring shape provided for the pointer 22 and a second magnet 23a provided for the pointer drive means to be opposite to the first magnet 22c, and the pointer 22 is rotated in association with rotation drive of the pointer drive means by attraction force of the first and second magnets 22c, 23a. A yoke 22d in a ring shape is located closer to a surface of the first magnet 22c that is not opposite to the second magnet 23a.

11 Claims, 5 Drawing Sheets

FOREIGN PATENT DOCUMENTS

| | | |
|---|---|---|
| JP | 54-070478 | 5/1979 |
| JP | 01-099019 | 7/1989 |
| JP | 03-044624 | 4/1991 |
| JP | 11018400 A * | 1/1999 |
| JP | 2002-323350 | 11/2002 |
| JP | 2003-161650 | 6/2003 |
| JP | 2005-265835 | 9/2005 |
| JP | 2008249504 A * | 10/2008 |
| JP | 2010243415 A * | 10/2010 |
| JP | 2011122865 A * | 6/2011 |

* cited by examiner

INDICATOR APPARATUS

RELATED APPLICATIONS

This application is the U.S. National Phase under 35 U.S.C. § 371 of International Application No. PCT/JP2008/054936, filed on Mar. 18, 2008, which in turn claims the benefit of Japanese Application No. 2007-073780, filed on Mar. 21, 2007, and Japanese Application No. 2007-236060, filed on Sep. 21, 2007, the disclosures of which Applications are incorporated by reference herein.

TECHNICAL FIELD

The present invention relates to an indicator apparatus in which a pointer points at an indicating portion on a display plate.

BACKGROUND ART

There have been conventionally indicator apparatuses in which a pointer points at an indicating portion on a dial (display plate). In such an indicator apparatus, the pointer is directly secured to a rotation shaft of a pointer drive means such as a stepping motor, and the pointer is rotated in association with rotation drive of the pointer drive means and thus caused to point at the indicating portion.

Such a structure, however, requires a punching step of forming a through hole for passing through the rotation shaft in the dial. These steps complicates the manufacture of the dial, thereby presenting the problem of the inability to manufacture the dial inexpensively. Especially, when a variable display element such as a liquid crystal display element is used for the dial as disclosed in Patent Document 1, a through hole should be formed in a glass substrate of the variable display element, therefore, causing the problem of an increase in the manufacture cost of the variable display element.

Patent Document 1: JP-UM-A-3-44624
Patent Document 2: JP-A-2003-161650

To address the problems, the present applicant has proposed an indicator apparatus in which a first magnet is provided for a pointer and a second magnet is provided for a pointer drive means such that the pointer is rotated in association with rotation drive of the pointer drive means by the magnetic force (attraction force) of the first and second magnets in Patent Document 2. According to the structure, the dial can be manufactured easily and inexpensively without requiring formation of a through hole in the display plate.

DISCLOSURE OF THE INVENTION

Problems that the Invention is to Solve

Simply placing the first magnet partially on the pointer as disclosed in Patent Document 2 (the first magnet is placed at two positions in Patent Document 2), however, results in insufficient attraction force for securing the pointer. When the pointer is rotated to point at a predetermined indication position, an overshoot occurs in which the pointer goes past the indication position. In addition, pulsation of the pointer may occur when the pointer is step-operated. Thus, the indicator apparatus has room for improvement.

The present invention has been made in view of the above mentioned problems, and it is an object thereof to provide an indicator apparatus in which a pointer is secured to a pointer drive means by attraction force of magnets and it is possible to prevent an overshoot and pulsation of the pointer with sufficient attraction force.

Means for Solving the Problems

To solve the problems, the present invention is an indicator apparatus having a display plate, a pointer provided on a front-face side of the display plate, and a pointer drive means provided on a back-face side of the display plate for rotating the pointer, characterized by including a first magnet in a ring shape provided for the pointer and a second magnet provided for the pointer drive means to be opposite to the first magnet, and in that the pointer is rotated in association with rotation drive of the pointer drive means by attraction force of the first and second magnets.

The present invention is characterized by including a yoke in a ring shape located closer to a surface of the first magnet that is not opposite to the second magnet.

The present invention is characterized in that each of the first and second magnets includes a plurality of S poles and a plurality of N poles alternately magnetized.

The present invention is characterized by including a pointer cap which covers a central portion of the pointer and in that the first magnet is located within the pointer cap.

The present invention is characterized by including a light-receive portion provided in a void portion of the first magnet for receiving illumination light emitted from the behind the pointer to illuminate the pointer.

The present invention is characterized in that an illumination means for emitting the illumination light is located on the display plate.

The present invention is characterized by including a bearing portion bonded to a shaft portion of the pointer drive means and in that the second magnet is provided in the bearing portion.

The present invention is characterized in that the second magnet is integrally formed with the bearing portion.

The present invention is characterized in that the display plate has a variable display element including a variable display portion at which the pointer points.

The present invention is characterized by including a support member which rotatably supports the pointer.

The present invention is characterized in that the display plate has a light-transmitting substrate on which the support member is located.

The indicator apparatus according to claim 1, characterized in that each of the first and second magnets includes the two magnetized poles on its surface opposite to each other.

The present invention is characterized in that the yoke has a clearance portion and that a light-guide portion which guides illumination light emitted from behind the pointer is located in the clearance portion.

The present invention is characterized in that each of the first and second magnets includes the two magnetized poles on its surface opposite to each other and in that the clearance portion intersects magnetic field boundaries of the first magnet in a substantially perpendicular direction.

ADVANTAGE OF THE INVENTION

The present invention relates to an indicator apparatus in which a pointer is secured to a pointer drive means by attraction force of magnets and it is possible to prevent an overshoot and pulsation of the pointer with sufficient attraction force.

DESCRIPTION OF REFERENCE NUMERALS AND SIGNS 21 display plate
21a light-transmitting substrate
21b liquid crystal display element (variable display element)
22 pointer
22a pointer body
22b pointer cap
22c first magnet
22d first yoke
22e light-receive portion
22f main-shaft receive portion
22g clearance portion
23 bearing portion
23a second magnet
23b second yoke
24 stepping motor
25 circuit substrate
26 LED (illumination means)
27 main shaft
28 main-shaft receive portion

BEST MODE FOR CARRYING OUT THE INVENTION

In the following, a first embodiment in which the present invention is applied to a vehicle combination meter will be described with reference to the accompanying drawings.

Figure 1:
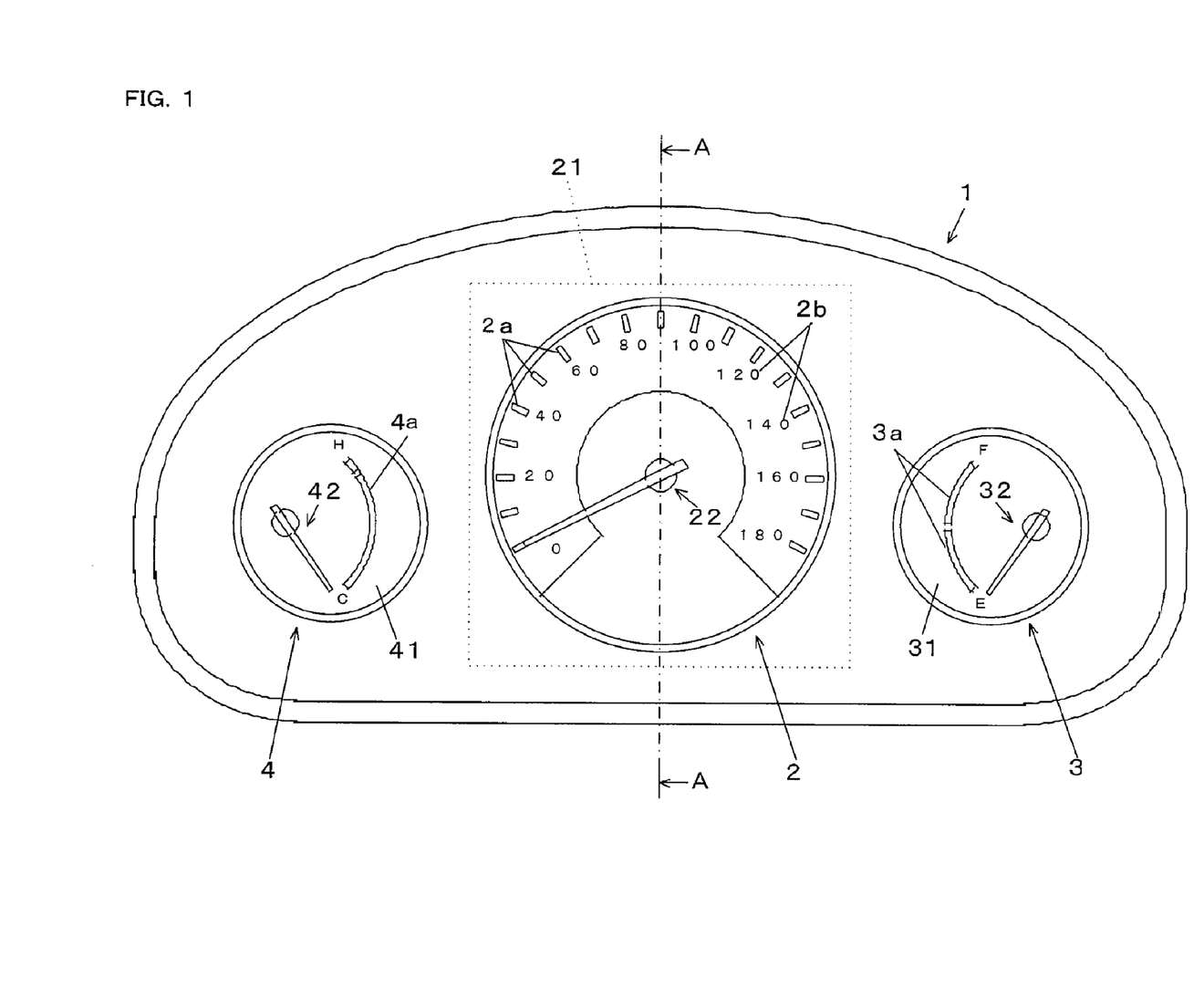
[FIG. 1] A front view showing a first embodiment of the present invention.

In FIG. 1, reference numeral 1 shows a housing. The housing 1 has a shade member and a case body to accommodate three indicators, that is, a speed meter 2, a fuel meter 3, and a water-temperature meter 4. The speed meter 2 is larger than the fuel meter 3 and the water-temperature meter 4 and is placed between the fuel meter 3 and the water-temperature meter 4. The speed meter 2 has a display plate 21 and a pointer 22. The fuel meter 3 and the water-temperature meter 4 have dials 31, 41, and pointers 32, 42, respectively. The dials 31, 41 are provided by forming light-shield portions through printing on substrates made of light-transmitting resin (for example, polycarbonate) except for indicating portions 3a, 4a, respectively. The pointers 32, 42 are rotated by a stepping motor (not shown) to point at the indicating portions 3a, 4a of the dials 31, 41, respectively.

Figure 2:
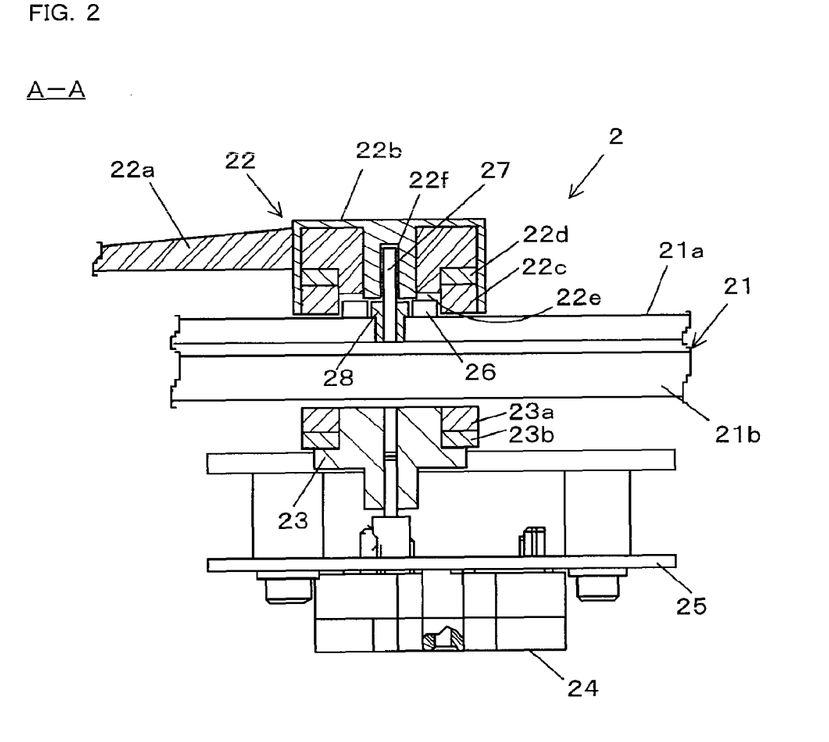
[FIG. 2] An enlarged section view of main portions to show the first embodiment.

FIG. 2 is an enlarged section view showing main portions. The speed meter 2 has the display plate 21, the pointer 22, a bearing portion 23, and the stepping motor 24. Reference numeral 25 shows a circuit substrate on which the stepping motor 24 is mounted.

The display plate 21 is formed of a light-transmitting substrate 21a and a liquid crystal display element (variable display element) 21b.

The light-transmitting substrate 21a is made of light-transmitting resin (for example, acrylic or polycarbonate), on which a support member, later described, for rotatably holding the pointer 22 is located.

The liquid crystal display element 21b is provided by sealing-in liquid crystal between a pair of light-transmitting substrates having a transparent electrode film formed thereon to provide a liquid crystal cell and then bonding a polarizing plate onto both surfaces of the liquid crystal cell. For example, a liquid crystal display element of dot-matrix type is used. The liquid crystal display element 21b can display variable contents and can display at least an indicating portion 2a and a character portion 2b.

The pointer 22 has a pointer body 22a, a pointer cap 22b, a first magnet 22c, and a first yoke 22d, and points at the indicating portion 2a displayed by the liquid crystal display element 22a.

The pointer body 22a is made of light-transmitting resin such as polycarbonate, and the pointer cap 22b is fitted at a rotation center portion thereof. The rotation center portion of the pointer body 22a has a hollow portion formed therein for inserting the first magnet 22c and the first yoke 22d. The pointer body 22a also has a light-receive portion 22e for receiving illumination light from an LED (an illumination means) 26 placed on the light-transmitting substrate 21a to illuminate the pointer body 22a. The light-receive portion 22e is formed to be positioned in a void portion of the ring-shaped first magnet 22c and first yoke 22d.

The pointer cap 22b is provided by forming non-light-transmitting resin, for example ABS resin, into a substantially tubular shape. The pointer cap 22b holds the first magnet 22c and the first yoke 22d pressed therein. The first magnet 22c and the first yoke 22d may be held in a different method. It is possible to use a method in which a protrusion is provided on a peripheral edge portion of the pointer cap 22b and the protrusion is deformed by the first magnet 22c and the first yoke 22d for holding, or a method in which a hook (a lock means) is formed for locking the first magnet 22c and the first yoke 22d on the peripheral edge portion of the pointer cap 22b. In a central portion of the pointer cap 22b, an insertion portion 22f is provided for inserting a main shaft of a substantially cylindrical shape which rotatably supports the pointer 22. Reference numeral 28 shows a main bearing portion which is located in a hollow portion formed in the light-transmitting substrate 21a to secure the main shaft 27. In the embodiment, the main shaft 27 and the main bearing portion 28 constitute the support member which rotatably supports the pointer 22.

Figure 3:
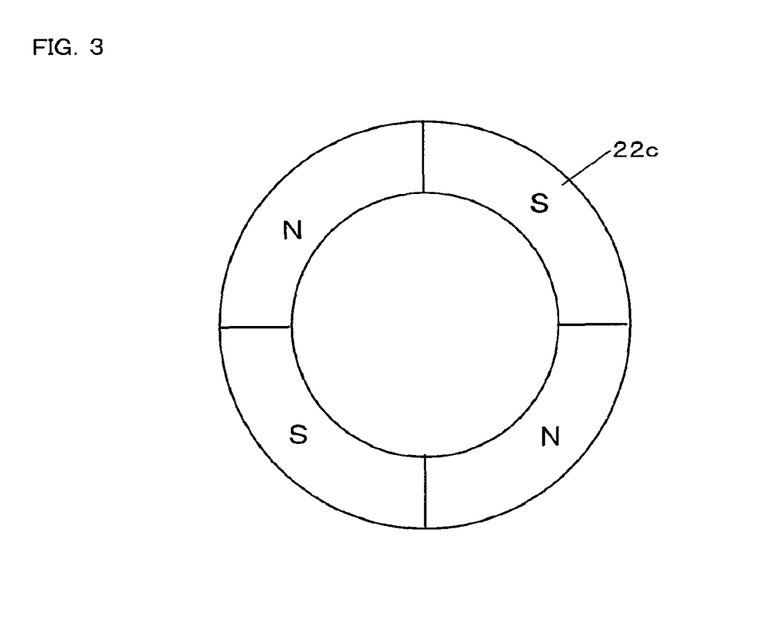
[FIG. 3] A diagram showing a first magnet used in the first embodiment.

The first magnet 22c is formed in a ring shape and includes a plurality of S poles and N poles alternately magnetized as shown in FIG. 3. In the embodiment, four poles are magnetized. The first magnet 22c and a second magnet 23a, later described, attract each other. The first magnet is made of neodyminum-iron-boron rare-earth magnet or samarium-cobalt rare-earth magnet, for example.

The first yoke 22d is provided closer to a surface of the first magnet 22c that is not opposite to the second magnet 23a (the non-opposite surface). The first yoke 22d constitutes a magnet circuit which suppresses leakage flux from the non-opposite surface of the first magnet 22c to improve the magnet efficiency.

The bearing portion 23 has the second magnet 23a and a second yoke 23b and is fitted to a rotation shaft 24a of the stepping motor 24. The pointer drive means in the embodiment is formed of the bearing portion 23 and the stepping motor 24.

The second magnet 23a is placed at the position opposite to the first magnet 22c with the display plate 21 interposed between them to form a pair with the first magnet 22c. Although not shown, the second magnet 23a includes a plurality of S poles and N poles alternately magnetized similarly to the first magnet. The second magnet 23a may be provided in a method in which the bearing portion 23 is formed with plastic magnet and the portion opposite to the first magnet 22c is magnetized, or in a method in which the second magnet 23a is formed with a different member from the bearing portion 23 and then insert molding or outsert molding is performed for integral formation. In this case, the second magnet 23a is made of the same material as that of the first magnet 22c.

The second yoke 23b is provided closer to a surface of the second magnet 23a that is not opposite to the first magnet 22c (the non-opposite surface). The second yoke 23b constitutes a magnet circuit which suppresses leakage flux from the non-opposite surface of the second magnet 23a to improve the magnet efficiency.

In the embodiment, the first magnet 22c is provided for the pointer 22 and the second magnet 23a is provided for the bearing portion 23 secured to the rotation shaft 24a of the stepping motor 24 such that the second magnet 23a is opposite to the first magnet 22c with the display plate 21 interposed between them. The first magnet 22c and the second magnet 23a attracting each other through the magnetic force can rotate the pointer 22 in association with the rotation drive of the stepping motor 24. Thus, the display plate 21 can be manufactured relatively inexpensively without requiring formation of a through hole in the liquid crystal display element 21b of the display plate 21 as in the conventional method in which the pointer is directly secured to the stepping motor.

In addition, the first magnet 22c provided for the pointer 22 is formed in the ring shape including the alternately magnetized N poles and S poles and is placed to surround the rotation center portion of the pointer 22, so that the attraction force with the second magnet 23a can be obtained over the entire rotation center portion of the pointer 22 to achieve the sufficient attraction force for securing the pointer 22, thereby suppressing an overshoot or pulsation of the pointer 22. The first yoke 22d provided closer to the non-opposite surface of the first magnet 22c that is not opposite to the second magnet 23a can improve the magnetic efficiency to enhance the attraction force even when the same first magnet 22c is used.

Since the light-receive portion 22e which receives the illumination light from the LED 26 is provided to be positioned in the void portion of the first magnet 22c and the first yoke 22d, the illumination light can be directed to the pointer body 22a to illuminate the pointer 22 favorably without being hindered by the first magnet 22c and the first yoke 22d even when they are located within the pointer cap 22b.

The light-transmitting substrate 21a is included in the display plate 21, and the support member for rotatably supporting the pointer 22 is located in the light-transmitting substrate 21a. This eliminates the need to perform processing of the liquid crystal display element 21b for supporting the pointer 22, so that the pointer 22 can be located easily and the liquid crystal display element 21b can be fabricated more inexpensively.

While the first and second magnets 22c, 23a are permanent magnets, the second magnet 23a may be an electromagnet, for example. An organic EL element may be used as the variable display element in addition to the liquid crystal display element 21b, and a segment type may be used in addition to the dot-matrix type. The display plate may have a fixed display element in which a light-shield portion is formed through printing on light-transmitting resin to form a fixed display portion at which the pointer 22 points, for example. The illumination means for illuminating the pointer 22 is not limited to the LED 26. For example, an organic EL element is used for the display plate 21 and the light from the organic EL element is directed toward the light-receive portion 22e. While the stepping motor 24 is included as the pointer drive means, it goes without saying that a cross-coil movement may be used, for example, instead of the stepping motor 24.

Next, a second embodiment of the present invention will be described. The components identical or corresponding to those in the above mentioned first embodiment are designated with the same reference numerals and detailed descriptions thereof are omitted.

Figure 4:
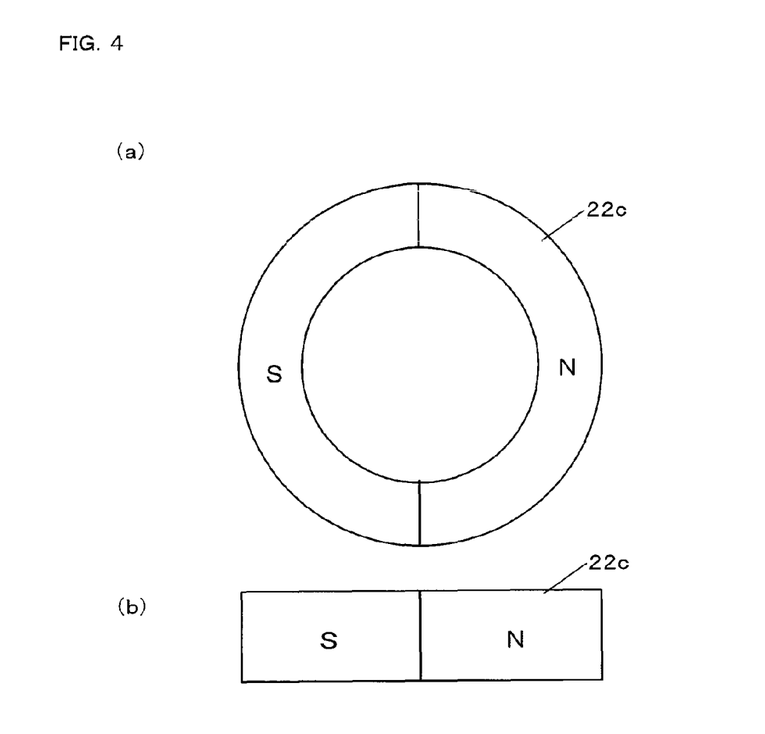
[FIG. 4] Diagrams showing a first magnet used in a second embodiment of the present invention.
Figure 5:
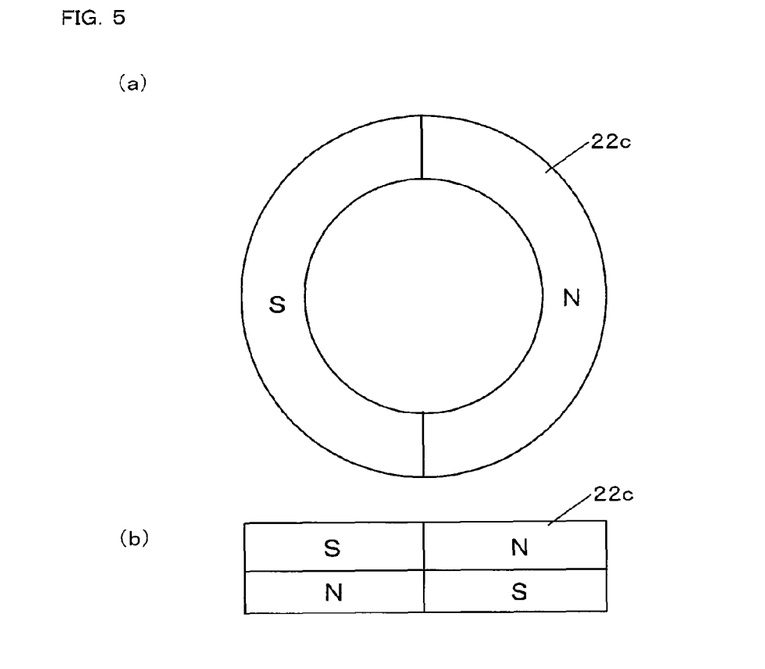
[FIG. 5] Diagrams showing another example of the first magnet used in the second embodiment.

The second embodiment differs from the first embodiment in a first point in which each of the first and second magnets 22c, 23a formed in the ring shape includes two magnetized poles on each opposite surface. FIG. 4 shows the first magnet 22c. FIG. 4(a) is a diagram of the first magnet 22c viewed from the surface opposite to the second magnet 23a. FIG. 4(b) is a diagram of the first magnet 22c viewed from the side (the curved surface). The first magnet 22c includes two magnetized poles on the opposite surface. In the second embodiment, it is essential only that the first magnet 22c should include two magnetized poles on the opposite surface. As shown in FIG. 5, the first magnet 22c may have two different poles magnetized on both planes. Although not shown, the second magnet 23a includes two magnetized poles on the surface opposite to the first magnet 22c similarly to the first magnet 22c.

Figure 6:
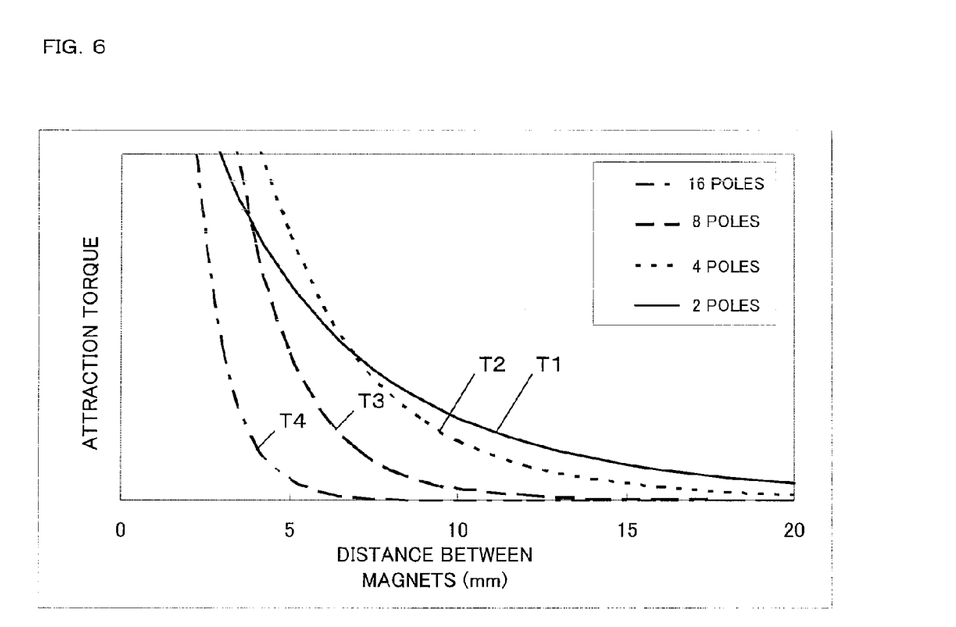
[FIG. 6] A graph showing the relationship between rotation torque from attraction force produced when a difference occurs in rotation of the first and second magnets and the distance between the first and second magnets in the second embodiment.

FIG. 6 is a graph showing the relationship between the rotation torque from the attraction force produced when a difference occurs in rotation of the first and second magnets 22c, 23a and the distance between the first and second magnets 22c, 23a. T1 represents the characteristic when two poles are magnetized on the opposite surface, T2 represents the characteristic when four poles are magnetized on the opposite surface, T3 represents the characteristic when eight poles are magnetized on the opposite surface, and T4 represents the characteristic when 16 poles are magnetized on the opposite surface. As apparent from FIG. 6, the present inventors have found that the characteristic T1 of the two-pole magnetization shows the highest attraction torque at a larger distance between the first and second magnets 22c, 23a. In the indicator apparatus in which the magnetic force of the first and second magnets 22c, 23a is used to rotate the pointer in association with the rotation drive of the pointer drive means, the provision of the display plate 21 between the first and second magnets 22c, 23a requires the distance between the first and second magnets 22c, 23a, so that the two magnetized poles on each of the opposite surfaces of the first and second magnets 22c, 23a can achieve the high attraction torque capable of rotating the pointer 22 in the indicator apparatus.

Figure 7:
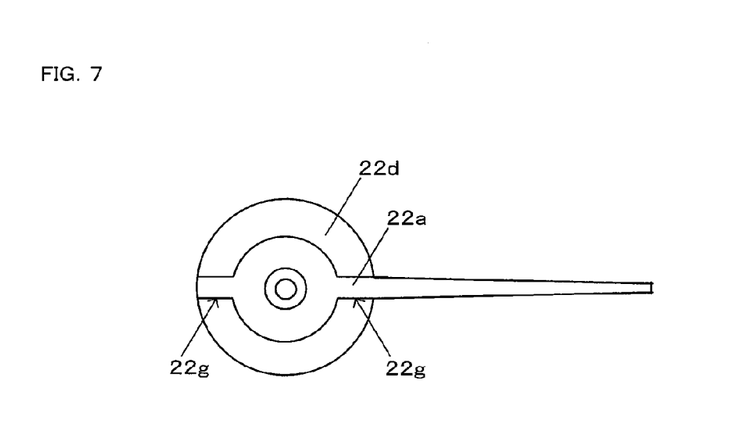
[FIG. 7] A front view showing main portions of the second embodiment.
Figure 8:
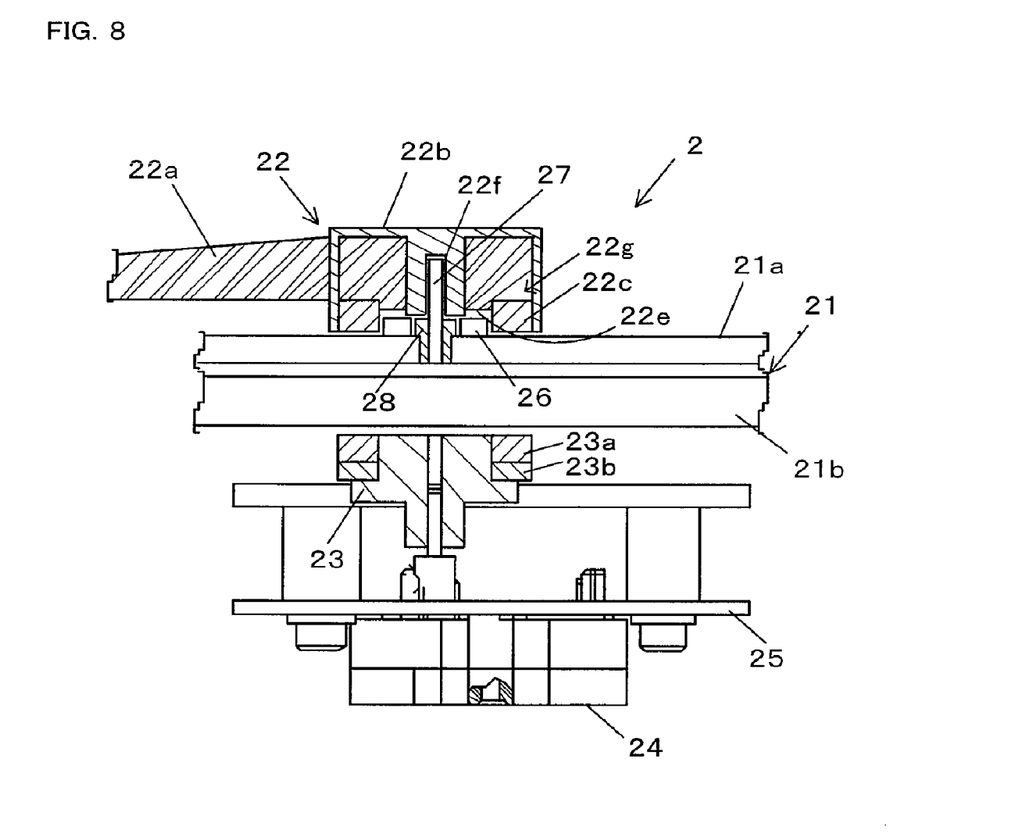
[FIG. 8] An enlarged section view of main portions to show the second embodiment.

The second embodiment differs from the first embodiment in a second point in which a clearance portion 22g is provided for the first yoke 22d, and a portion of the pointer body 22a is located in the clearance portion 22g as shown in FIG. 7. The clearance portion 22g is formed to intersect, substantially perpendicularly, the magnetic pole boundaries of the first magnet 22c including two magnetized poles on its surface opposite to the second magnet 23a. FIG. 7 is a front view showing only the first yoke 22d and the pointer body 22a to simplify the description. The portion of the pointer body 22a located in the clearance portion 22g serves as a light-guide portion which guides illumination light emitted from behind the pointer 22 toward the tip of the pointer body 22a. Since the clearance portion 22g is formed in the first yoke 22d and the light-guide portion is placed in the clearance portion 22g in this manner, an increased distance can be prevented between the pointer body 22a and the display plate 21 as shown in a section view of FIG. 8 even when the first yoke 22d is provided, thereby allowing a reduction in read errors of indication. As a result of the investigations of the position where the clearance portion 22g is formed, it has been showed that the clearance portion 22g is formed only of the member of the first yoke 22d and the clearance portion 22g intersects the magnetic pole boundaries of the first magnet 22c substantially perpendicularly to prevent a reduction in the attraction torque by the formation of the clearance portion 22g to suppress pulsation of the pointer 22.

Industrial Applicability

The present invention relates to an indicator apparatus in which a pointer points at an indicating portion on a display plate, and is preferable for an indicator apparatus in which a variable display element such as a liquid crystal display element is used for a display plate.

The invention claimed is:

1. An indicator apparatus comprising:
   a display plate,
   a pointer provided on a front-face side of the display plate,
   a pointer drive means provided on a back-face side of the display plate for rotating the pointer,
   a first magnet in a ring shape provided for the pointer,
   a second magnet provided for the pointer drive means opposite to the first magnet,
   a yoke in a ring shape located closer to a surface of the first magnet that is not opposite to the second magnet,
   a light-guide portion, which guides illumination light emitted from behind the pointer,
   wherein:
   the pointer is rotated in association with rotation drive of the pointer drive means by attraction force of the first and second magnets,
   each of the first and second magnets includes two magnetized poles on its surface opposite to each other,
   the yoke comprises a clearance portion,
   the light-guide portion is located in the clearance portion, and
   the clearance portion intersects magnetic field boundaries of the first magnet in a substantially perpendicular direction.

2. The indicator apparatus according to claim 1, characterized in that each of the first and second magnets includes a plurality of S poles and a plurality of N poles alternately magnetized.

3. The indicator apparatus according to claim 1, characterized by including a pointer cap which covers a central portion of the pointer and in that the first magnet is located within the pointer cap.

4. The indicator apparatus according to claim 1, characterized by including a light-receive portion provided in a void portion of the first magnet for receiving illumination light emitted from behind the pointer to illuminate the pointer.

5. The indicator apparatus according to claim 4, characterized in that an illumination means for emitting the illumination light is located on the display plate.

6. The indicator apparatus according to claim 1, characterized by including a bearing portion bonded to a shaft portion of the pointer drive means and in that the second magnet is provided in the bearing portion.

7. The indicator apparatus according to claim 6, characterized in that the second magnet is integrally formed with the bearing portion.

8. The indicator apparatus according to claim 1, characterized in that the display plate has a variable display element including a variable display portion at which the pointer points.

9. The indicator apparatus according to claim 1, characterized by including a support member which rotatably supports the pointer.

10. The indicator apparatus according to claim 9, characterized in that the display plate has a light-transmitting substrate on which the support member is located.

11. The indicator apparatus according to claim 1, characterized in that each of the first and second magnets includes the two magnetized poles on its surface opposite to each other.

\* \* \* \* \*